US010468901B2

(12) United States Patent
Lee et al.

(10) Patent No.: US 10,468,901 B2
(45) Date of Patent: Nov. 5, 2019

(54) ACCESSORY DEVICE FOR WIRELESS CHARGING AND ELECTRONIC DEVICE HAVING THE SAME

(71) Applicant: Samsung Electronics Co., Ltd., Suwon-si, Gyeonggi-do (KR)

(72) Inventors: Uijin Lee, Yongin-si (KR); Sangwon Lee, Seoul (KR); Geunbeom Kim, Seoul (KR); Myunggi Seo, Suwon-si (KR); Jungtaek Lim, Suwon-si (KR); Chihun Hawng, Yongin-si (KR); Joonil Kim, Seoul (KR); Kyung-Woo Lim, Suwon-si (KR); Youngmi Seo, Suwon-si (KR); Seungju Lee, Suwon-si (KR); Byeonghyun Jang, Bucheon-si (KR); Jong-Chul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 15/201,890

(22) Filed: Jul. 5, 2016

(65) Prior Publication Data

US 2017/0047764 A1 Feb. 16, 2017

(30) Foreign Application Priority Data

Aug. 12, 2015 (KR) .......................... 10-2015-0113621

(51) Int. Cl.
*H02J 7/02* (2016.01)
*H02J 7/00* (2006.01)
(Continued)

(52) U.S. Cl.
CPC ............ *H02J 7/025* (2013.01); *H02J 7/0021* (2013.01); *H02J 7/0042* (2013.01);
(Continued)

(58) Field of Classification Search
CPC ...................................................... H02J 7/025
(Continued)

(56) References Cited

U.S. PATENT DOCUMENTS 9,319,501 B2* 4/2016 Huang ................ H04M 1/0283
2009/0096413 A1* 4/2009 Partovi ................... H01F 5/003
320/108
(Continued)

FOREIGN PATENT DOCUMENTS

CN 202818413 U 3/2013
DE 20 2015 101 232 U1 4/2015
(Continued)

OTHER PUBLICATIONS

European Search Report dated Nov. 28, 2018; Application #: 16 835 291.2-1202; Ref #: P6072296PCT/EP.
(Continued)

*Primary Examiner* — Edward Tso
*Assistant Examiner* — Ahmed H Omar
(74) *Attorney, Agent, or Firm* — Jefferson IP Law, LLP

(57) ABSTRACT

An apparatus and a method for wirelessly charging are disclosed. An accessory device is detachably mounted on an electronic device. The accessory device includes a housing including a first face configured to oppose a face of the electronic device when the housing is mounted on the electronic device, a second face opposite to the first face, and a third face extending in a first direction from the first face so as to enclose at least a portion of a side face. The accessory device further includes a battery and at least one conductive pattern electrically connected to the battery. The accessory device can transmit power to the electronic device in a wireless manner and/or receive power from an external device in a wireless manner. Areas of the first face and the
(Continued)

third face of the housing of the accessory device are formed of a non-conductive material.

21 Claims, 17 Drawing Sheets

(51) Int. Cl.
*H04B 1/3888* (2015.01)
*H04M 1/18* (2006.01)
*H04M 1/725* (2006.01)
*H02J 50/00* (2016.01)

(52) U.S. Cl.
CPC ............ *H04B 1/3888* (2013.01); *H02J 50/00* (2016.02); *H04M 1/185* (2013.01); *H04M 1/7253* (2013.01)

(58) Field of Classification Search
USPC .......................................................... 320/115
See application file for complete search history.

(56) References Cited

U.S. PATENT DOCUMENTS

| | | |
|---|---|---|
| 2011/0227527 A1 | 9/2011 | Zhu et al. |
| 2012/0088555 A1 | 4/2012 | Hu |
| 2014/0070762 A1 | 3/2014 | Jenwatanavet et al. |
| 2014/0194160 A1 | 7/2014 | Jing et al. |
| 2014/0285033 A1 | 9/2014 | Jantunen et al. |
| 2014/0321052 A1* | 10/2014 | Diebel ................. G06F 1/1628 361/679.56 |
| 2014/0368164 A1 | 12/2014 | Jung |
| 2015/0035474 A1 | 2/2015 | Yang et al. |
| 2015/0195390 A1 | 7/2015 | Lin |
| 2015/0205562 A1 | 7/2015 | Lin et al. |
| 2015/0270734 A1* | 9/2015 | Davison ................ H02J 7/0054 320/103 |
| 2017/0033580 A1* | 2/2017 | Colahan ............... H02J 7/0045 |

FOREIGN PATENT DOCUMENTS

| | | |
|---|---|---|
| JP | 2015-506657 A | 3/2015 |
| KR | 10-1441677 B1 | 9/2014 |

OTHER PUBLICATIONS

European Search Report dated Feb. 13, 2019; Application #: 16 835 291.2-1202; Ref #: P6072296PCT/EP.

European Office Action dated May 23, 2019, issued in a counterpart European application No. 16835 291.2-1202.

"Coque Batterie Externe Power Jacket"; "https://www.youtube.com/watch?reload=9&v=TnOnyU-u1Xk". (Published Feb. 19, 2013).

* cited by examiner

ACCESSORY DEVICE FOR WIRELESS CHARGING AND ELECTRONIC DEVICE HAVING THE SAME

CROSS-REFERENCE TO RELATED APPLICATION(S)

This application claims the benefit under 35 U.S.C. § 119(a) of a Korean patent application filed on Aug. 12, 2015 in the Korean Intellectual Property Office and assigned Serial number 10-2015-0113621, the entire disclosure of which is hereby incorporated by reference.

TECHNICAL FIELD

The present disclosure relates to a wireless charger. More particularly, the present disclosure relates to an accessory device for wireless charging and an electronic device including the same.

BACKGROUND

Developments of electronic devices may be applied to various fields close to a person's life. Such electronic devices are made in various sizes in consideration of the functions thereof and the user's preferences. Attention to stylistic appearance is considered, in addition to the functions of the electronic devices, as well as the trend toward reducing the sizes of the electronic devices. Users practically prefer an electronic device having superior aesthetic design when the electronic device has substantially the same function as other electronic devices. In particular, an accessory device (e.g., a protective housing or a protective cover), which is separately mounted on an electronic device in order to protect a housing that forms the exterior of the electronic device, or a partial region of the electronic device, has emerged as an alternative to attract users' attention for the electronic device.

Recently, in addition to the basic functions to protect the electronic device or to improve the aesthetics of the electronic device, such an accessory device is provided with various additional functions so that the convenience of using the electronic device is gradually improved.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for charging an electronic device via an accessory device.

In accordance with an aspect of the present disclosure, a battery charging method is provided. The battery charging method of an electronic device includes a wired charging method and a wireless charging method. In the wired charging method, a connector of a charger (e.g., a traveler adaptor (TA)) is physically connected directly to a connector port separately provided on the outside of the electronic device so as to charge the battery of the electronic device. The wireless charging method refers to a method of charging the battery or an electronic device without a separate charging line by using a magnetic induction method or a magnetic resonance method. The charging operation may be performed in a state where the electronic device is laid on a charging pad of a separately provided wireless charger.

In accordance with another aspect of the present disclosure, since the wireless charger should also be used in the state where it is electrically connected to a fixed power source (e.g., an alternate current (AC) power source), users' desire to use an electronic device may not be satisfied since the users have recently become sensitive to portability. Further, even though the wireless charging is performed by the above-mentioned wireless charger using an accessory device (e.g., a protection cover) connected to the electronic device via a wire, this may also not satisfy the portability.

In accordance with another aspect of the present disclosure, an accessory device for wireless charging and an electronic device including the accessory device is provided.

In accordance with another aspect of the present disclosure, an accessory device, which is improved in terms of easy wireless charging and portability for an electronic device, and an electronic device including the accessory device is provided.

In accordance with another aspect of the present disclosure, an accessory device, which may be easily carried even during wireless charging so as to improve the convenience using of an electronic device, and an electronic device including the accessory device is provided.

In accordance with another aspect, an accessory device detachably mounted on a mobile electronic device is provided. The electronic device includes a housing including a first face facing in a first direction, a second face facing a second direction that is opposite to the first direction, and a side face that at least partially encloses a space between the first face and the second face. The accessory device may include a housing including a first face configured to face the second face of the electronic device when the housing is mounted on the electronic device, a second face directed opposite to the first face, and a third face extending in the first direction from the first face so as to enclose at least a portion of the side face, a battery disposed between the first face and the second face of the housing of the accessory device, and at least one conductive pattern electrically connected to the battery, and configured to transmit power to the electronic device in a wireless manner or to receive power from an external device in a wireless manner. A substantially entire area of the first face and a substantially entire area of the third face of the housing of the accessory device are formed of a non-conductive material.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
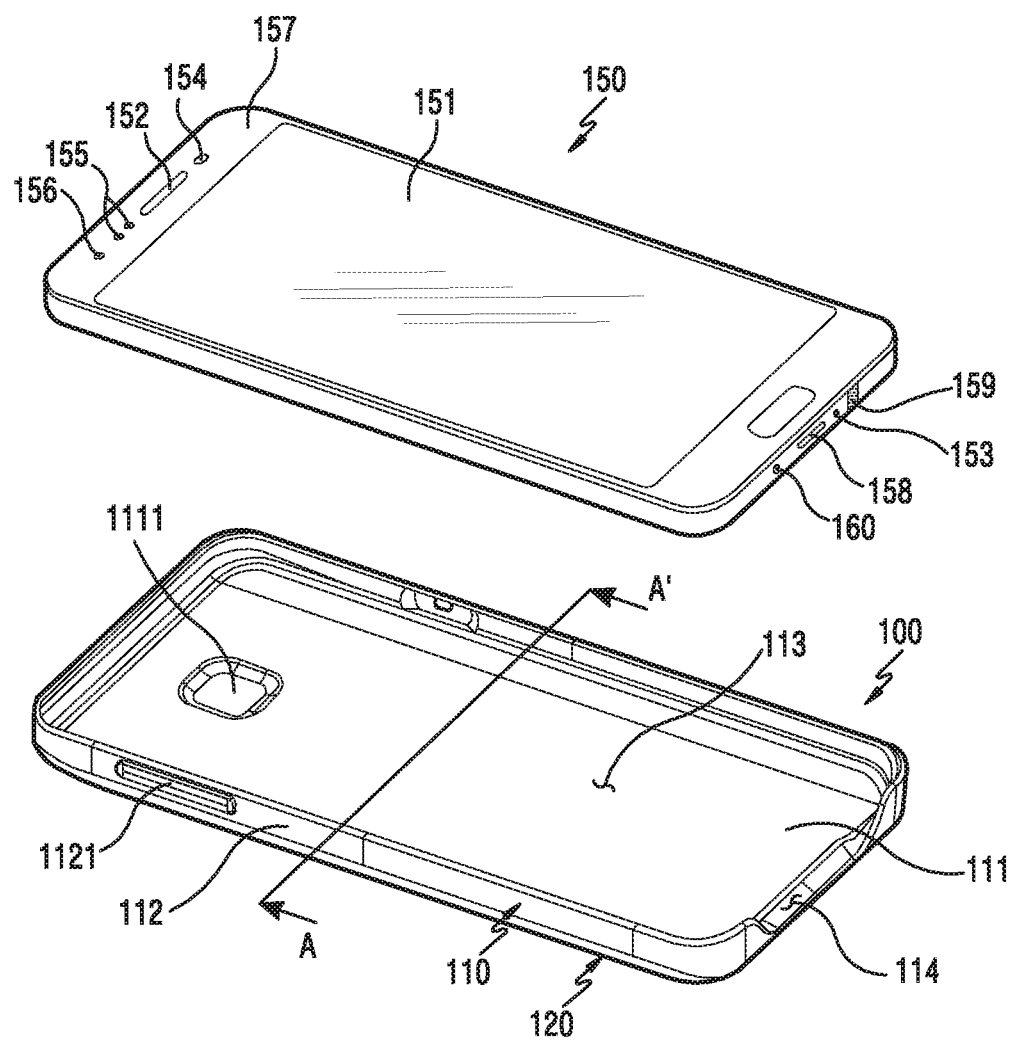
FIG. 1A is an exploded perspective view illustrating an accessory device and an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a digital video disc (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

FIG. 1A is an exploded perspective view illustrating an accessory device 100 and an electronic device 150 according to various embodiments of the present disclosure.

Figure 1B:
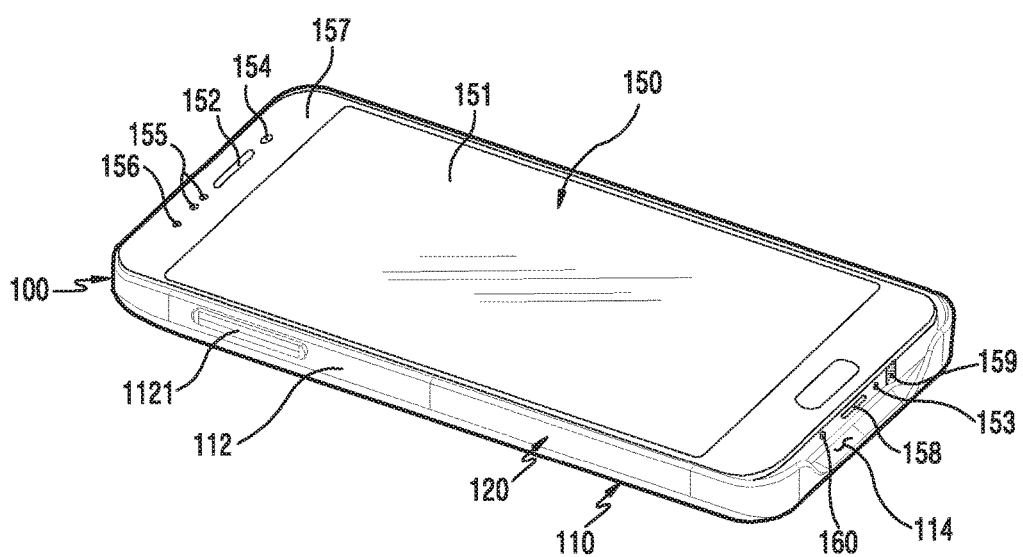
FIG. 1B is a perspective view illustrating a state in which an electronic device is mounted on the accessory device according to various embodiments of the present disclosure.

FIG. 1B is a perspective view illustrating a state in which an electronic device 150 is mounted on the accessory device 100 according to various embodiments of the present disclosure.

Referring to FIGS. 1A and 1B, an accessory device 100 may be disposed so as to protect at least a partial region of an electronic device 150, and the charging position of the electronic device 150 for wireless charging can be aligned merely by mounting the electronic device 150 on the accessory device 100. According to various embodiments, the accessory device 100 may cause the wireless charging to be initiated merely when the electronic device 150 is mounted thereon. Without being limited thereto, however, the accessory device 100 may cause the wireless charging to be initiated by the user's operation of a key button after the electronic device 150 is mounted thereon.

According to various embodiments, the electronic device 150 is configured to include a display 151 as illustrated in the drawing, but is not limited thereto. For example, the accessory device 100 may be used for charging various electronic devices which do not include a display. According to one embodiment, the accessory device 100 accommodates the electronic device 100 in such a manner of enclosing the entire region of the rim of the electronic device 100, but may be disposed on at least a partial region of the electronic device without being limited thereto.

According to an embodiment of the present disclosure, the electronic device 150 may include a display 151 installed on the front face 157 thereof, as illustrated in FIG. 1A. A speaker device 152 may be installed above the display 151 so as to receive a voice of a counterpart. A microphone device 153 may be installed below the display 151 so as to transmit a voice of the user of the electronic device. According to one embodiment, an interface connector port 158 for accommodating an interface connector of an external device for wired charging or data transmission/reception (e.g., a wired charger or a PC), or an ear jack hole 160 for accommodating an ear jack plug may be arranged at one side of the microphone device 153. According to one embodiment, another speaker device 159 for video telephony or music output may be arranged at the other side of the microphone device 153.

According to various embodiments, components for conducting various functions of the electronic device 150 may be arranged around the speaker device 152. The components may include one or more sensor modules 155. The sensor modules 155 may include at least one of, for example, an illuminance sensor (e.g., an optical sensor), a proximity sensor, an infrared sensor, and an ultrasonic sensor. According to one embodiment, the components may include a camera device 154. According to one embodiment, the components may include a light emitting diode (LED) indicator 156 that informs the user of the status information of the electronic device 150 (e.g., operation status information of an application or charge information). According to one embodiment, although not illustrated, a reception coil for power reception may be arranged within the electronic device 150 at a position that corresponds to that of a transmission coil for power transmission, which is arranged in the accessory device 100.

According to various embodiments, the accessory device 100 may include a fixing unit 110 that fixes the electronic device 150, and a charging unit 120 that wirelessly charges the electronic device 150 when the electronic device 150 is fixed by the fixing unit 110. According to one embodiment, the fixing unit 110 and the charging unit 120 may be integrally formed with each other. According to one embodiment, the fixing unit 110 and the charging unit 120 may be separately formed from each other to be detachable from/attachable to each other. The fixing unit 110 and the charging unit 120 may be separated from each other by a mounting plate 111, as a border therebetween, in which a device mounting space 113 of the electronic device 150 is formed. For example, the fixing unit 110 may be disposed in an upper portion of the charging unit 120, but is not limited thereto. The fixing unit 110 may be disposed in a lower portion or a side portion of the charging unit 120.

According to various embodiments, the fixing unit 110 may include a side face 112 that forms a border with the charging unit 120, and is formed to have a constant or non-constant height along the rim of the mounting plate 111 that contributes to forming the device mounting space 113 of the electronic device 150. According to one embodiment, the side face 112 may be formed to tightly enclose at least a portion of the side face of the electronic device 150 mounted in the device mounting space 113. According to one embodiment, the fixing unit 110 may be formed of an elastic and flexible member (e.g., urethane, silicon, or silicon). According to one embodiment, at least one key button pressing protrusion 1121 may be formed to protrude on the side face 112 such that the corresponding key button of the mounted electronic device 150 can be pressed by the user's operation. According to one embodiment, an accommodation recess 1111 may be formed in the device mounting space 113 so as to accommodate an electronic component (e.g., a camera device or a sensor module), which is disposed on the rear face of the electronic device 150 to protrude from the rear face. According to still another embodiment, a through-hole (not illustrated) may be formed in the device mounting space 113 so as to allow an electronic component (e.g., a camera device or a sensor module), which is disposed on the rear face of the electronic device 150 to protrude from the rear face, to perform a function thereof. According to one embodiment, the through-hole may enable the camera device, the sensor module, or the sound device (speaker or microphone) to perform a function thereof. Accordingly, in the case where the electronic device 150 is mounted in the device mounting space 113 of the accessory device 100 and is fixed to the fixing unit 110, the bottom face of the electronic device 150 may be arranged to be in surface contact with the mounting plate 111 of the accessory device 100. This may contribute to the smooth charging of the electronic device 100 by the charging unit 120.

According to various embodiments, a device separation recess 114 may be formed such that at least a portion of the side face 112 of the fixing unit 110 does not have a height and at least a portion of a bottom edge of the mounted electronic device 150 can be exposed. According to one embodiment, the device separation recess 114 may serve as a pull-out recess so as to allow the electronic device 150 to be easily separated from the fixing unit 110 because the side face 112 of the fixing unit 110 tightly fixes the rim of the electronic device 150. According to one embodiment, the device separation recess 114 may be located at a position that corresponds to a portion of the bottom side of the electronic device 150. According to one embodiment, the device separation recess 114 exposes at least one electronic component disposed on a portion of the bottom side of the electronic device 150 (e.g., a microphone device, an ear jack hole, a speaker device, or an interface connector port) therethrough such that, even though the electronic device 150 is mounted in the accessory device 100, the convenience using of the electronic device 150 can be improved.

Accordingly, as illustrated in FIG. 1B, even if the electronic device 150 is tightly mounted in and fixed to the fixing unit 110 of the accessory device 100, at least one electronic component disposed on the bottom side of the electronic device 150 (e.g., a microphone device, an ear jack hole, a speaker device, or an interface connector port) may be exposed through the device separation recess 114, and a portion of the bottom edge of the electronic device may also exposed.

According to various embodiments, the accessory device 100 may be carried in the state where the electronic device 150 is mounted in the device mounting space 113, and may wirelessly charge the electronic device 150 using an inner battery while the accessory device 100 is carried. Thus, the portability can be improved.

According to various embodiments, merely with an operation in which the electronic device 150 is mounted in the device mounting space 113, the accessory device 100 can sense the electronic device 150 to charge the electronic device 150. Without being limited thereto, however, the accessory device 100 may be configured to cause the wireless charging operation to be initiated by the user's separate operation of a key button without performing the wireless charging operation automatically even if the electronic device 150 is mounted thereon.

Figure 2:
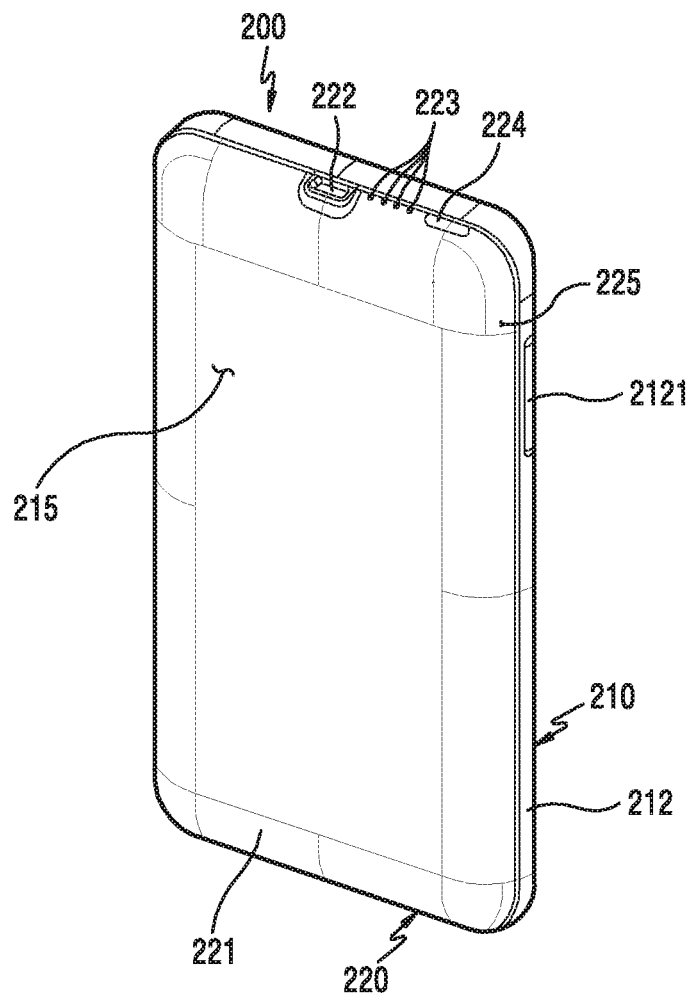
FIG. 2 is a perspective view illustrating a rear side of the accessory device according to various embodiments of the present disclosure.

FIG. 2 is a perspective view illustrating a rear side of an accessory device 200 according to various embodiments of the present disclosure.

Referring to FIG. 2, the accessory device 200 of FIG. 2 may be similar to or different from the accessory device 100 of FIG. 1A.

Referring to FIG. 2, the accessory device 200 may include a fixing unit 210 configured to fix the electronic device in a manner of enclosing at least a portion of the electronic device, and a charging unit 220 configured to wirelessly charge the electronic device mounted in the fixing unit 210. The fixing unit 210 may include a side face 212 and a key button pressing protrusion 2121. According to one embodiment, a rear housing 221 configured to form the rear face 215 of the accessory device 200 and the mounting plate 111 of FIG. 1A may be coupled to each other so as to provide a mounting space in which charging components for charging to be described later are disposed.

According to various embodiments, a charging port 222 may be disposed in the upper portion of the rear housing 221 to be connected to an external charger via a wire in order to charge a battery cell (hereinafter, referred to as a "battery") that is disposed within the accessory device 200.

According to various embodiments, one or more LED indicators 223 may be sequentially arranged at one side of the charging port 222. According to one embodiment, the LED indicators 223 may visually inform the user of the amount of charge remaining in the battery. According to one embodiment, the LED indicators 223 may visually inform the user of the wireless charging status of the electronic device. For example, the LED indicators 223 may include four (4) light emitting units to provide visual information in such a manner that when the remaining amount of the battery is 100%, four (4) light emitting units is turned ON, when the remaining amount of the battery is 50%, two (2) light emitting units is turned ON, and when the remaining amount of the battery is 0%, no light emitting unit is turned ON. According to one embodiment, one or more other LED indicators 223 may be disposed at a location of the rear housing 221. According to one embodiment, the other LED indicators 225 may indicate whether the battery is normally charged by outputting a color. According to one embodiment, the LED indicators 225 may be controlled such that blue color is turned ON when the battery is normally charged, and green color is turned on when the battery is abnormally charged. According to one embodiment, the LED indicators 225 may be controlled to turn ON (to continuously turn ON) blue color when the battery is normally charged, and to cause blue color to blink when the battery is abnormally charged. According to various embodiments, at least one key button 224 may be arranged at one side of the LED indicators 223. According to one embodiment, the at least one key button 224 may be operated such that the remaining amount of the battery is output through the LED indicators 223 according to the user's operation. According to one embodiment, the key button 224 may be operated such that the current charge status of the electronic device is output through the LED indicators 223. According to one embodiment, after the electronic device is mounted on the accessory device 200, the key button 224 may be used as an initiation or termination button for wireless charging. According to one embodiment, the key button 224 may be configured such that, when the key button 224 is shortly pressed, any one of the above-mentioned corresponding functions is performed. According to one embodiment, the key button 224 may be configured such that, when the key button 224 is continuously pressed over a predetermined length of time, any one of the above-mentioned corresponding functions is performed. According to one embodiment, the key button 224 may be configured such that, when the key button 224 is shortly pressed at least twice at a predetermined interval, any one of the above-mentioned corresponding functions is performed. According to one embodiment, when the key button 224 is shortly pressed once, the remaining amount of the battery may be indicated through the LED indicators 223. According to one embodiment, the wireless charging operation may be terminated when the key button 224 is pressed long once in the state where the electronic device is mounted.

In various embodiments of the present disclosure, information related to the battery status is visually provided through the LED indicators 223 according to the operation of the key button 224, but various embodiments are not limited thereto. For example, the accessory device 200 may include a vibrator (e.g., a vibration motor) so as to tactually provide information related to the battery status to the user using at least one of the vibration duration time, the number of times of repeating vibration, or a vibration repeating pattern of the vibrator according to the operation of the key button 224.

In various embodiments of the present disclosure, the key button 224 operated by the user is used, but various embodiments are not limited thereto. For example, the accessory device 200 may include at least one motion sensor (e.g., a geomagnetic sensor or an acceleration sensor) so as to induce the above-described visual output or tactual output by a motion input of the accessory device 200. According to one embodiment, when the accessory device 200 is shaken from side to side, the remaining amount of charge in the internal battery may be output through the LED indicators 223. According to one embodiment, when the accessory device 200 is shaken up and down, the current wireless charge state may be output through the LED indicators 223.

Figure 3A:
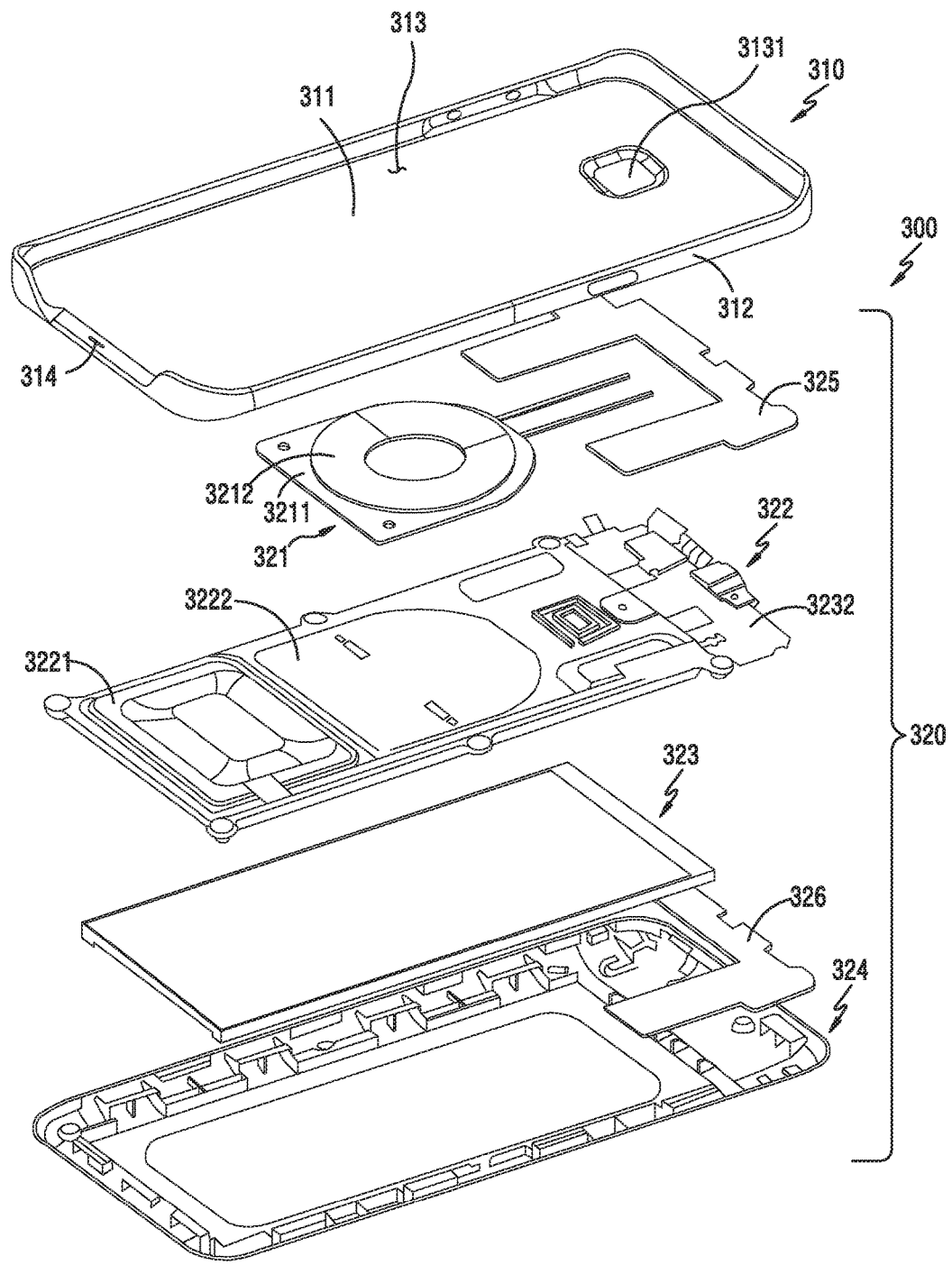
FIG. 3A is an exploded perspective view illustrating an accessory device according to various embodiments of the present disclosure.

FIG. 3A is an exploded perspective view illustrating an accessory device 300 according to various embodiments of the present disclosure.

Referring to FIG. 3A, the accessory device 300 of FIG. 3A may be similar to or different from the accessory device 100 of FIG. 1A or the accessory device 200 of FIG. 2.

Referring to FIG. 3A, the accessory device 300 may include a fixing unit 310 configured to fix the electronic device, and a charging unit 320 disposed below the fixing unit 310. According to one embodiment, the fixing unit 310 may be formed in a manner of disposing a side face 312 having a height along the rim of a mounting plate 311. According to one embodiment, a device mounting space 313 for an electronic device may be provided by the coupling of the mounting plate 311 and the side face 312. According to one embodiment, the components of the charging unit 320 may be applied to the device mounting space which is formed as the rear housing 324 of the accessory device 300 and the mounting plate 311 are coupled to each other.

According to one embodiment, the fixing unit 310 may include the mounting plate 311 that forms the bottom surface of the device mounting space 313 for the electronic device and the side face 312 disposed to have a height along the rim of the mounting plate 311. According to one embodiment, the mounting plate 311 and the side face 312 may be formed by injection molding using different kinds of materials. Without being limited thereto, however, the mounting plate 311 and the side face 312 may be physically coupled to each other by a coupling structure. In such a case, the mounting plate 311 and the side face 312 may be coupled to each other using at least one fixing method among bonding, welding, and taping. According to one embodiment, the mounting plate 311, which is coupled to the rear housing 324 and supports the bottom face of the electronic device, may be formed of a rigid material (e.g., PC, a metal, or a composite material). According to one embodiment, since the side face 312 has elasticity and should tightly fix at least a portion of the electronic device, the side face 312 may be formed of an elastic member (e.g., urethane, silicon, or rubber). According to one embodiment, the fixing unit 310 may include a device separation recess 314 and an accommodation recess 3131, as described above with regard to FIG. 1A.

In various embodiments of the present disclosure, the charging unit 320 may include a coil unit 321, a bracket unit 322, and a battery cell 323, which may be sequentially stacked in this order.

According to various embodiments, the coil unit 321 may be arranged in such a manner that a coil member 3212 is stacked on the top surface of a plate type shielding member 3211. According to one embodiment, the coil member 3212 may be disposed on the bottom surface of the shielding member 3211. According to one embodiment, two coil members may be disposed on different surfaces of the shielding member 3211, respectively. According to one embodiment, the shielding member 3211 is used for preventing the magnetic field of the coil member 3212 from affecting the surrounding in advance, and for improving a charge performance, and may be formed of, for example, a ferrite material.

According to various embodiments, the bracket unit 322 may include a bracket 3221 and a printed circuit board (PCB) 3232 extending from the bracket 3221. According to one embodiment, the bracket 3221 may serve to fix electronic components to the front and rear faces thereof, and may serve to maintain or reinforce the entire strength of the accessory device 300. According to one embodiment, a coil unit accommodation portion 3222 configured to accommodate the coil unit 321 may be provided on the front face of the bracket 3221, and the battery 323 may be disposed on the rear face of the bracket 3221. According to one embodiment, a charging connector port and the PCB 3232 configured to mount electronic components thereon may be disposed on the upper end of the bracket 3221. According to one embodiment, the PCB 3232 may also be disposed on the lower end of the bracket 3221 in addition to the upper end of the bracket 3221. According to one embodiment, the bracket 3221 may be made of a material that is stronger than those of the mounting plate 311 and the rear housing 324 in order to maintain the strength thereof. According to one embodiment, the bracket 3221 may be made of a resin containing glass fiber. Alternatively, the bracket 3221 may be made of a metallic material, such as SUS. According to one embodiment, the bracket 3221 may further include, on the surface thereof, a coating layer for thermal diffusion. According to one embodiment, for the thermal diffusion, a metal layer may be additionally formed on the surface of the bracket 3221 through plating or deposition, and a coating layer, such as a diamond like coating (DLC), may be further provided. According to one embodiment, the coating layer is connected to a main heat generating source, such as a board, as a heat radiating member so as to enable a higher level of thermal diffusion.

When being connected to a power source through the above-described charging connector port, the battery 323 is charged, and when the electronic device is mounted in the device mounting space 313 disposed in the fixing unit 310 of the accessory device 300, the battery 323 may be used as a power supply source for wireless charging.

According to various embodiments, heat radiation members (e.g., heat radiation sheets) 325 and 326, each of which has a size corresponding to the board 3232, may be further disposed above and below the board 3232. According to one embodiment, the heat radiation members 325 and 326 are provided to diffuse heat generated from the board 3232 around the board 3232 during wireless charging. The heat radiation members 323 and 326 may have a shape corresponding to the board 3232, and may be formed in the form of radiation that is spaced away from a heat generating source (e.g., an electronic component mounted on the board). According to one embodiment, the heat radiation members 325 and 326 may be formed using various heat-diffusible materials (e.g., a graphite sheet, a copper sheet, TIM, a heat pipe, and graphene).

According to various embodiments, the board 3232 may further include a hall sensor. Without being limited to this, however, hall sensors may be arranged at various positions of the accessory device 300. According to one embodiment, the hall sensor detects a magnetic force of at least one magnet that has already been disposed or intentionally disposed inside the electronic device, and provides a detection signal to the controller of the accessory device 300 such that the accessory device 300 can initiate a wireless charging operation merely when the electronic device is mounted thereon. According to one embodiment, the magnet may include a magnet of a speaker device, a vibrator motor, or a microphone device that has already been mounted in the electronic device. According to one embodiment, a hall sensor may be installed at a position corresponding to the position of the magnet included in the speaker of the electronic device. In such a case, the hall sensor may face a corresponding position of the bracket, and may be electrically connected to the corresponding position by a board or a flexible printed circuit board (FPCB).

Figure 3B:
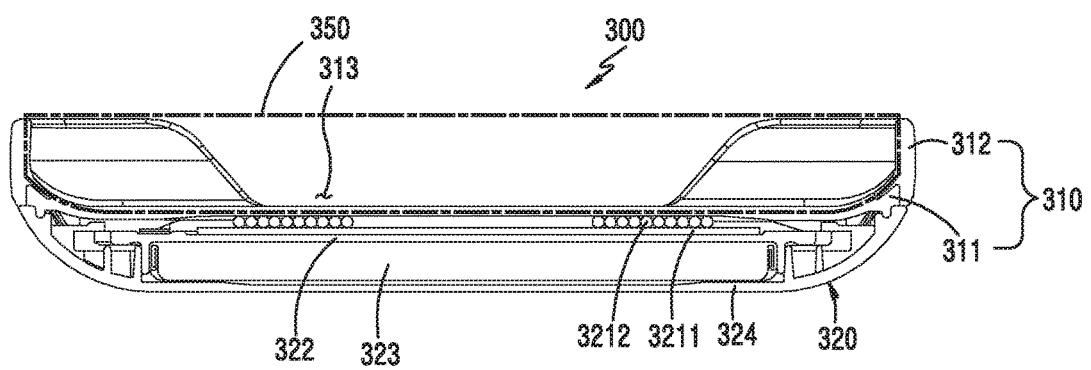
FIG. 3B is a sectional view illustrating a coupled state of the accessory device according to various embodiments of the present disclosure, which is viewed in the direction of line A-A' in FIG. 1A.

FIG. 3B is a sectional view illustrating a coupled state of the accessory device 300 according to various embodiments of the present disclosure, which is viewed in the direction of line A-A' in FIG. 1A.

Referring to FIG. 3B, the accessory device 300 may be configured by coupling the rear housing 324 that configures the charging unit 320 and the fixing unit 310 to each other. According to one embodiment, in the fixing unit 310, a mounting plate 311 formed of a hard material and a side face 312 formed of a relatively soft material may be coupled to each other, and the fixing unit 310 may be configured in a manner of coupling the coupled mounting plate 311 and side face 312 to the rear housing 324.

According to one embodiment, the battery 323 may be fixed in a space formed by the rear housing 324 and the bracket 3221. According to one embodiment, a coil unit 321, which includes a coil member 3212, may be disposed above the bracket 3221. The coil unit 321 may be disposed at a position corresponding to a power reception coil that is included in the electronic device 350 mounted in the device mounting space 313 at the rear face of the mounting plate 311.

Figure 4A:
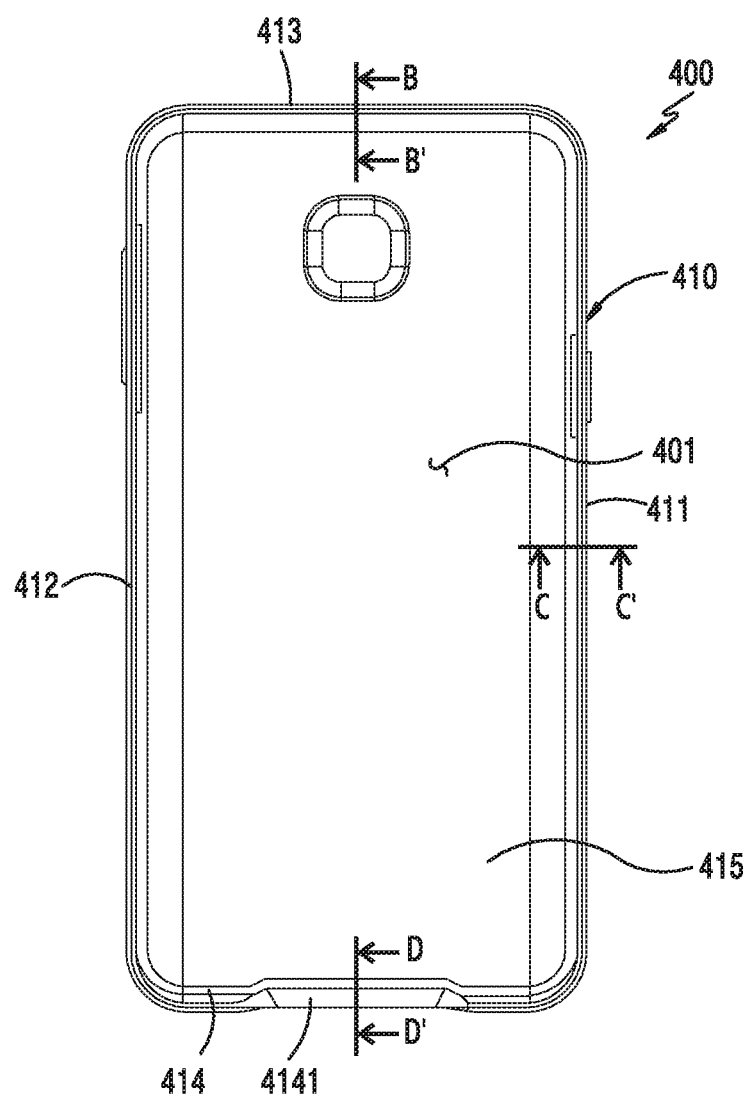
FIG. 4A is a plan view illustrating a configuration of an accessory device according to various embodiments of the present disclosure.

FIG. 4A is a plan view illustrating a configuration of an accessory device 400 according to various embodiments of the present disclosure.

Referring to FIG. 4A, the accessory device 400 of FIG. 4A may be similar to or different from the accessory device 100 of FIG. 1A, the accessory device 200 of FIG. 2, or the accessory device 300 of FIG. 3A.

Referring to FIG. 4A, the fixing unit 410 of the accessory device 400 may be used for fixing at least a partial region of the electronic device.

According to various embodiments, an electronic device may be frequently mounted on/detached from the accessory device (e.g., an accessory cover) 400 unlike an ordinary accessory device. According to one embodiment, in the case of an ordinary accessory device, once an electronic device is mounted in the ordinary accessory device, the electronic device itself may be replaced, or in the case where the accessory device is of a battery replacement type, the accessory device may be detached in order to replace the battery. However, the detaching frequency may not be high. On the contrary, in the case of the accessory device according to an embodiment of the present disclosure, an electronic device may be frequently mounted on or detached from the accessory device. The electronic device may be mounted on the accessory device in order to charge the electronic device, and then, may be may be used in the mounted state. However, when the residual amount of the battery of the electronic device is sufficient, the electronic device may be used after detach the accessory device in order to use the electronic device in a slim state. In such a case, since the accessory device may be replaced more frequently than an ordinary accessory device, it may be necessary for the electronic device to be easily mounted on/detached from the accessory device 400.

According to various embodiments, the fixing unit 410 may include a right locking portion 411, a left locking portion 412, an upper locking 413, and a lower locking portion 414. According to one embodiment, each of the locking portions 413, 414, 415, and 416 may include a locking protrusion that protrudes by a predetermined extent toward the device mounting space 401 of the mounting plate 415. According to one embodiment, the protruding extents of respective locking protrusions may be set to be different from each other such that the electronic device can be easily attached to/detached from the device mounting space 401 of the fixing unit 410 of the electronic device. According to one embodiment, a partial region of the lower locking portion 414 may be formed as a device separation recess 4141 so that the locking protrusion may not be formed.

Figure 4B:
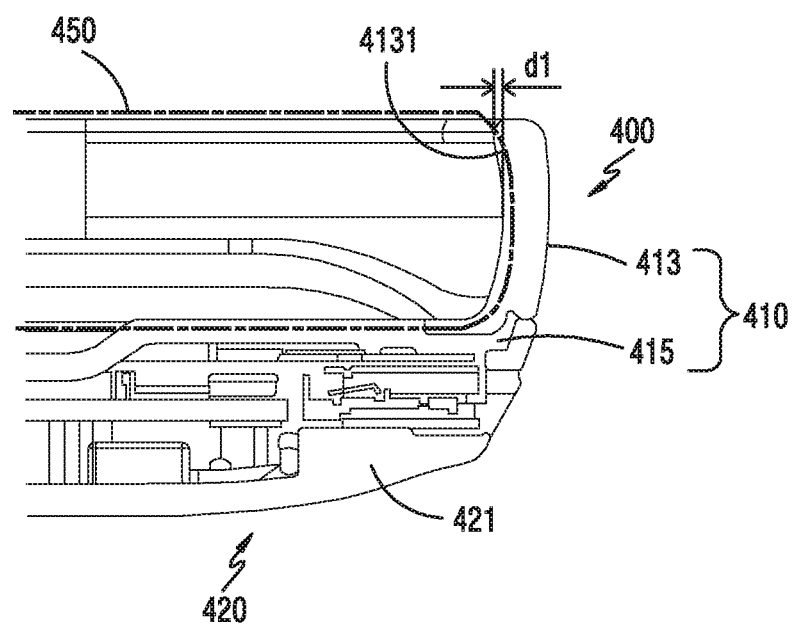
FIG. 4B is a sectional view illustrating a main portion of the accessory device according to various embodiments of the present disclosure, which is viewed in the direction of line B-B' in FIG. 4A.

FIG. 4B is a sectional view illustrating a main portion of an accessory device 400 according to various embodiments of the present disclosure, which is viewed in the direction of line B-B' in FIG. 4A.

Referring to FIG. 4B, the accessory device 400 may include a charging unit 420 with a rear housing 421 and a fixing unit 410 that is disposed above the charging unit 420. According to one embodiment, the upper locking portion 413 of the fixing unit 410 may include a first locking protrusion 4131 that inwardly protrudes by a protruding extent d1. According to one embodiment, when the electronic device 450 is mounted in the fixing unit 410, the upper locking portion 413 made of a soft material may be slightly pushed backward. When the electronic device 450 is completely mounted, the first locking protrusion 4131 presses the electronic device 450 due to the restoring force that tends to maintain the original state again. Thus, the separation of the electronic device can be prevented, and the mounting position of the electronic device can be fixed.

Figure 4C:
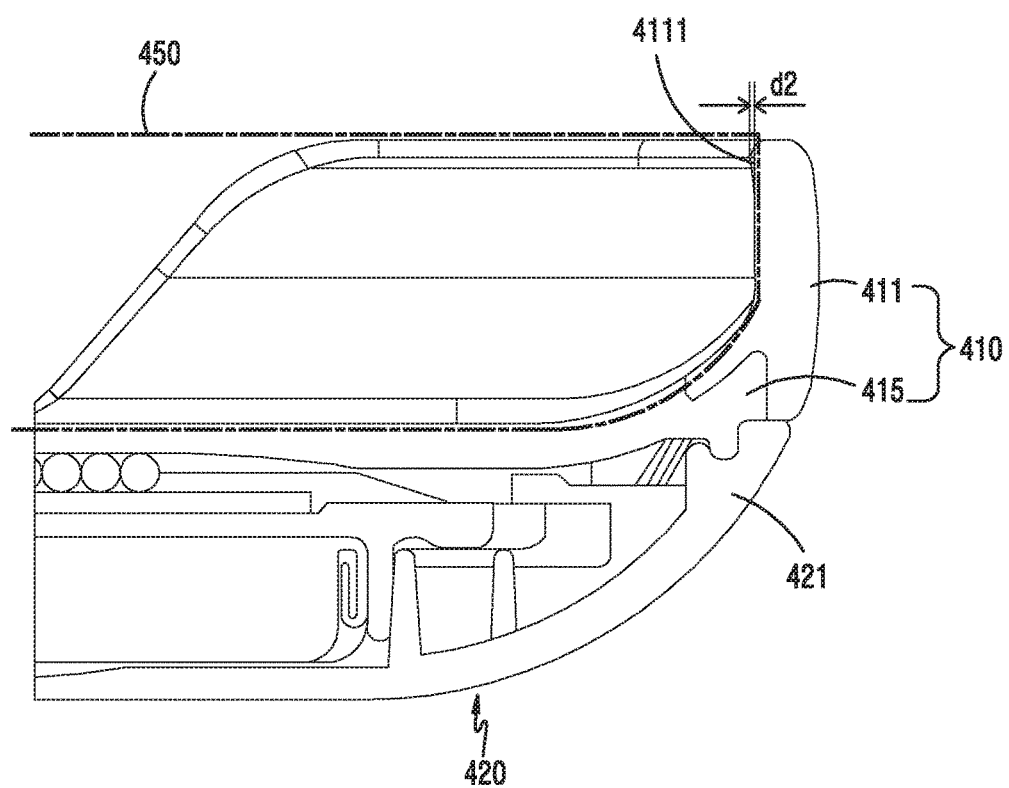
FIG. 4C is a sectional view illustrating a main portion of the accessory device according to various embodiments of the present disclosure, which is viewed in the direction of line C-C' in FIG. 4A.

FIG. 4C is a sectional view illustrating a main portion of the accessory device 400 according to various embodiments of the present disclosure, which is viewed in the direction of line C-C' in FIG. 4A.

Referring to FIG. 4C, the accessory device 400 may include a charging unit 420 and a fixing unit 410 that is disposed above the charging unit 420. According to one embodiment, the right locking portion 411 of the fixing unit 410 may include a second locking protrusion 4111 that is formed to inwardly protrude by a protruding extent d2. According to one embodiment, when the electronic device 450 is mounted in the fixing unit 410, the right locking portion 411 made of a soft material may be slightly pushed backward. When the electronic device 450 is completely mounted, the second locking protrusion 4111 presses the electronic device 450 due to the restoring force that tends to maintain the original state again. Thus, the separation of the electronic device can be prevented, and the mounting position of the electronic device can be fixed. According to one embodiment, the left locking portion 412 may also include a locking protrusion that is formed to inwardly protrude by the protruding extent d2 as the second locking protrusion 4111 of the right locking protrusion 411.

Figure 4D:
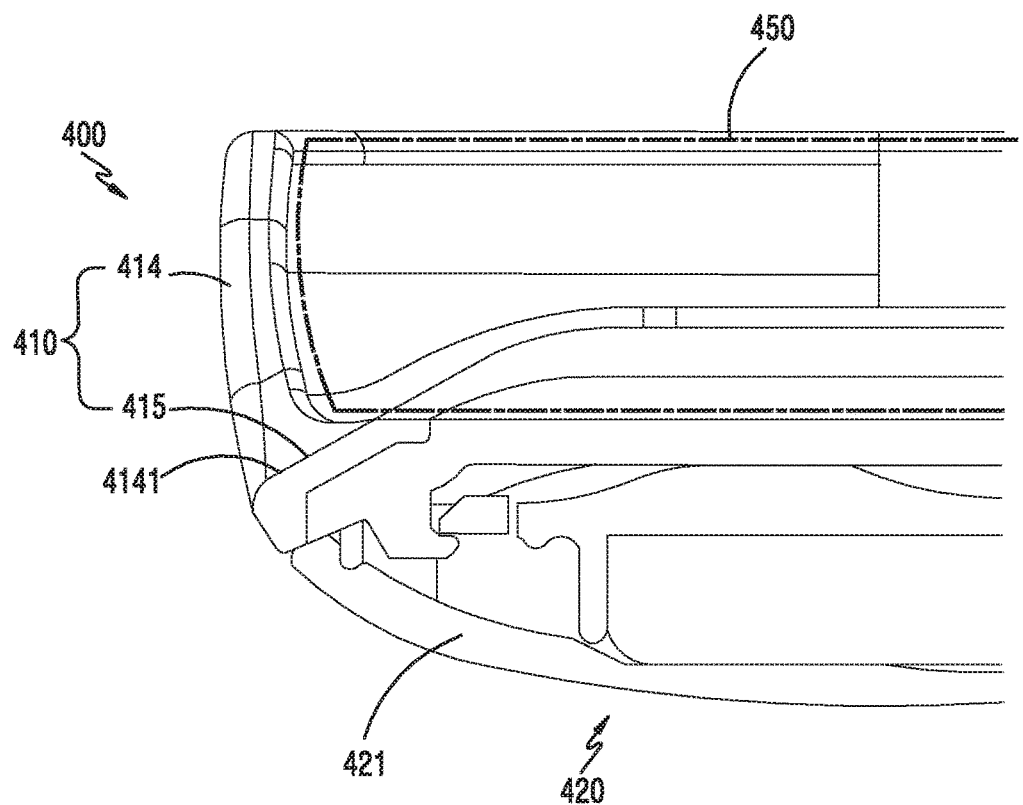
FIG. 4D is a sectional view illustrating a main portion of the accessory device according to various embodiments of the present disclosure, which is viewed in the direction of line D-D' in FIG. 4A.

FIG. 4D is a sectional view illustrating a main portion of the accessory device 400 according to various embodiments of the present disclosure, which is viewed in the direction of line D-D' in FIG. 4A.

Referring to FIG. 4D, in the case where the electronic device 450 is mounted in the device mounting space of the accessory device 400, the device separation recess 4141 formed in the lower locking portion 414 is not formed as a locking portion, but may be formed to expose a portion of the lower edge of the electronic device 450. According to one embodiment, the lower locking portion 414, which is formed with the device separation recess 4141, may be determined as a region where the separation of the electronic device 450 is initially started from the accessory device 400.

According to various embodiments, the protruding extent d2 of the second locking protrusion 4111 of the right locking portion 411 of the accessory device 400 may be set to be larger than the protruding extent d1 of the first locking protrusion 4131 of the right locking portion 411 of the accessory device 400 such that, when the electronic device 450 is taken out from the device mounting space 401 of the fixing unit 410, the electronic device 450 may be guided to be separated last at the upper locking portion 413. According to one embodiment, the upper locking portion 413, which includes the first locking protrusion 4131 with the largest protruding extension, may be formed at a position that faces the lower locking portion 414 that is formed with the device separation recess 4141 (longitudinal direction). This is to cause the electronic device 450 to be taken out by lifting the electronic device 450 upward from the device separation recess 4141 and making the opposite first locking portions 4131 serve as a pivot such that the electronic device 450 can be easily separated from the accessory device 400.

Figure 5:
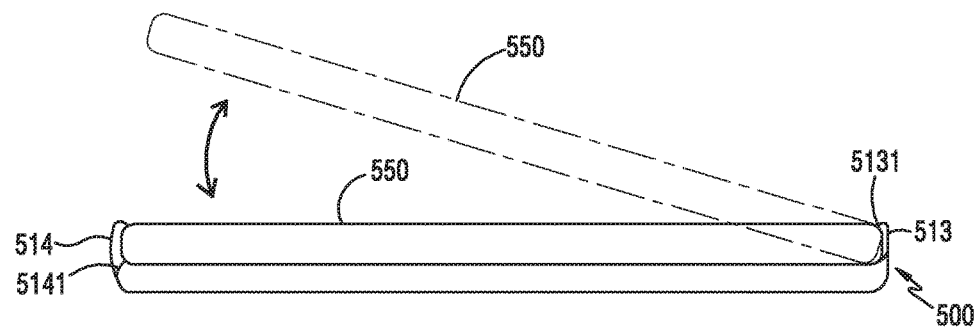
FIG. 5 is an operation view illustrating a state in which an electronic device is taken out from an accessory device according to various embodiments of the present disclosure.

FIG. 5 is an operation view illustrating a state in which an electronic device 550 is taken out from an accessory device 500 according to various embodiments of the present disclosure.

Referring to FIG. 5, the accessory device of FIG. 5 may be similar to or different from the accessory device 100 of FIG. 1A, the accessory device 200 of FIG. 2, the accessory device 300 of FIG. 3A, or the accessory device of the FIG. 4A.

Referring to FIG. 5, it is possible to lift the electronic device 550 upward by using the device separation recess 5141 formed in the lower locking portion 514 in order to take out the electronic device 550 mounted in the accessory device 500. In such a case, the electronic device 550 may be separated first at the left and right locking portions (not illustrated) that have a protruding extension that is relatively smaller than the locking protrusion 5131 that is formed in the upper locking portion 513. In such a case, the electronic device 550 may be easily separated from the accessory device 500 by being pivoted about the upper locking portion 513, as illustrated in the drawing.

According to various embodiments, even in the case where the electronic device 550 is mounted in the accessory device 500, the electronic device 550 can be easily mounted in the accessory device 500 by pivoting the upper locking portion 513 in the state where the upper side of the electronic device 550 has been mounted to the upper locking portion 513 of the accessory device 500 first to be inclined.

Figure 6:
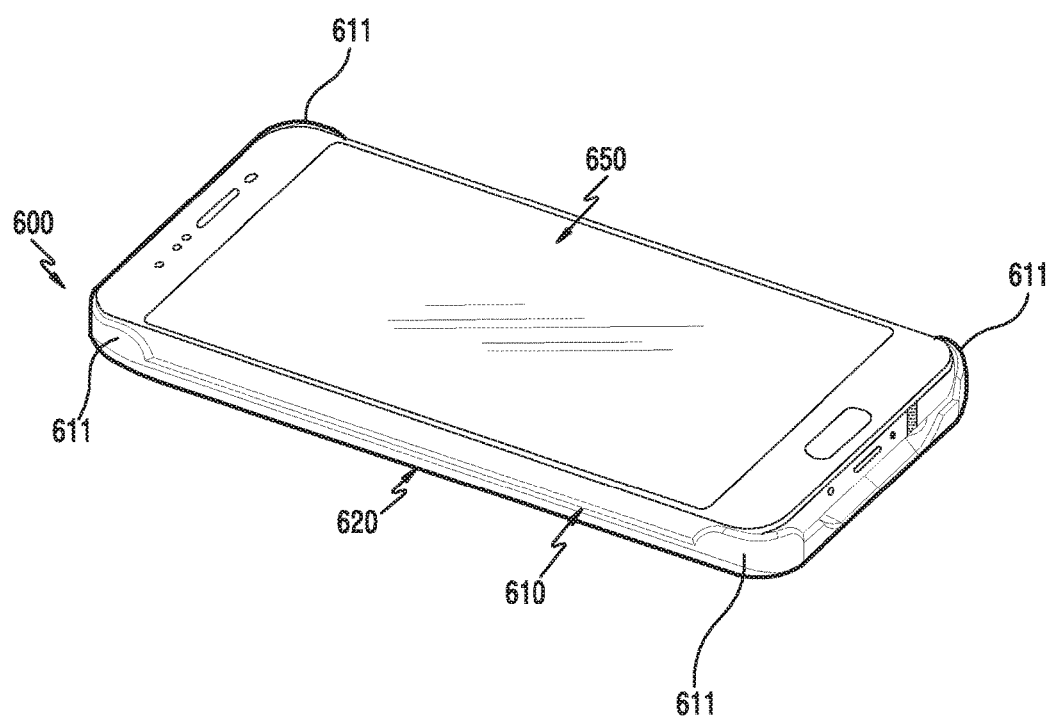
FIG. 6 is a perspective view illustrating a state in which an electronic device is mounted on the accessory device according to various embodiments of the present disclosure.

FIG. 6 is a perspective view illustrating a state in which an electronic device 650 is mounted on the accessory device 600 according to various embodiments of the present disclosure.

Referring to FIG. 6, a fixing unit 610 of an accessory device 600 configured to accommodate and charge an electronic device 650 may be modified in various forms. According to one embodiment, the fixing unit 610, which is disposed above the charging unit 620, may include locking portions 611 that are formed to enclose only the four corners of the electronic device 650, rather than enclosing the entire rim of the electronic device 650. According to one embodiment, in the locking portions 611 formed at the four corners, the protruding extent of locking protrusions formed on the locking portions of a longer direction may be set to be larger than the protruding extent of locking protrusions formed of a shorter direction such that the electronic device 650 can be mounted on or detached from the fixing unit 610 in the same manner as that illustrated in FIG. 5. According to one embodiment, the locking portions 611 are arranged to support the four corners of the electronic device 650, but the present disclosure is not limited thereto. At least one locking portion may be applied to fix at least a partial region of each of the left, right, upper and lower sides of the electronic device 650.

Figure 7A:
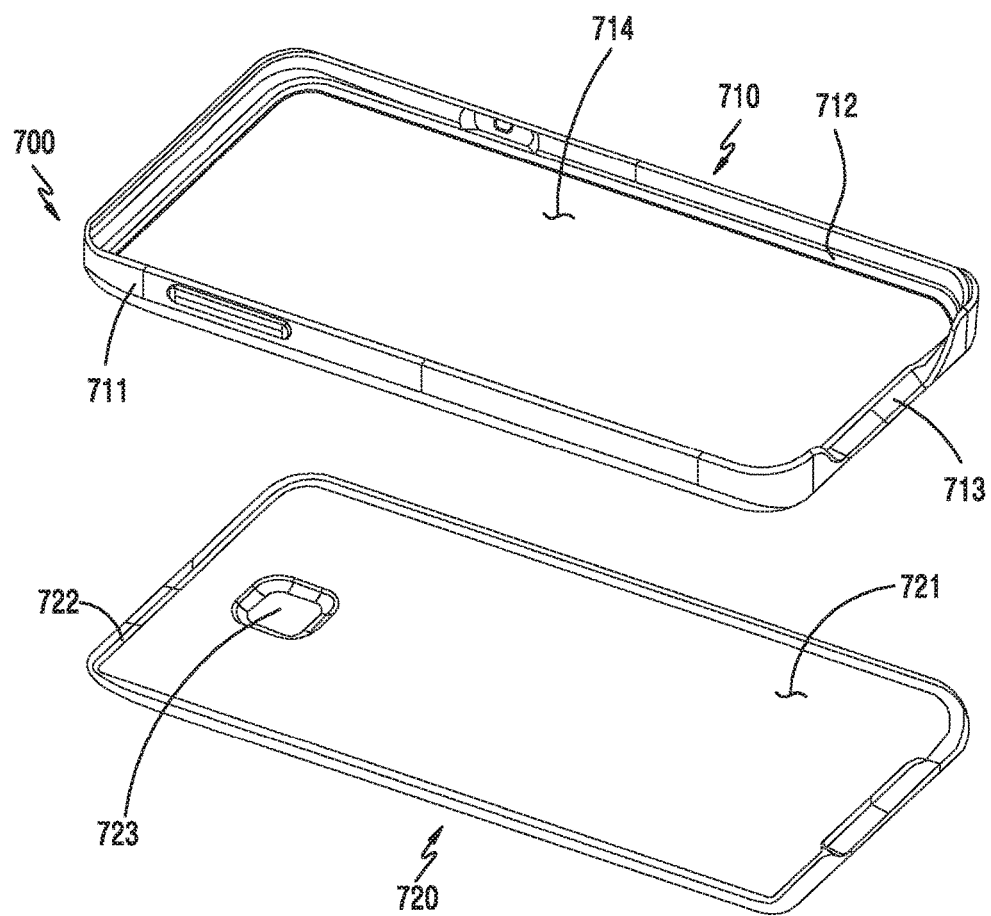
FIG. 7A is a perspective view of an accessory device which illustrates a state in which a fixing unit is separated from a charging unit according to various embodiments of the present disclosure.

FIG. 7A is a perspective view of an accessory device 700 which illustrates a state in which a fixing unit 710 is separated from a charging unit 720 according to various embodiments of the present disclosure.

Figure 7B:
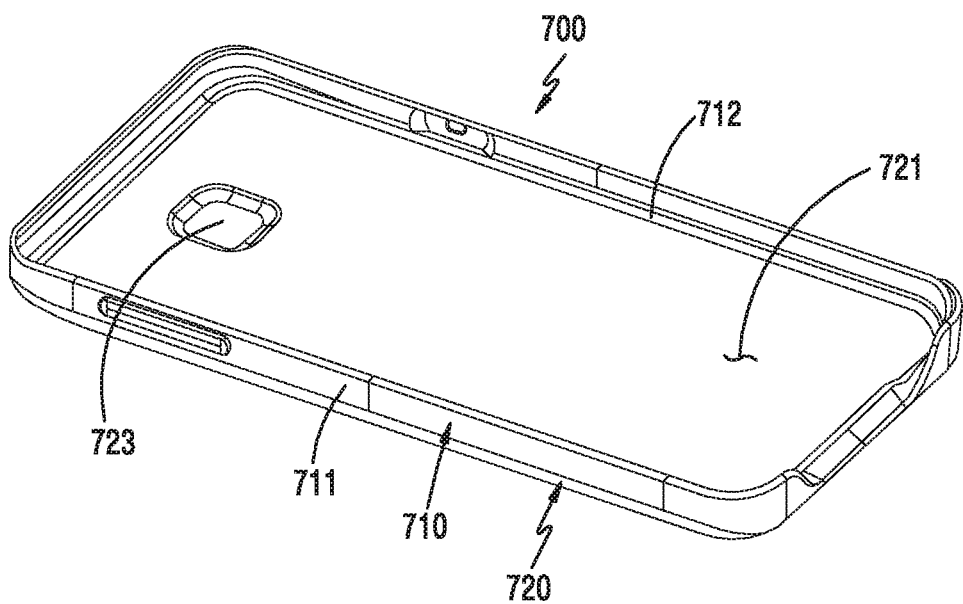
FIG. 7B is a perspective view of an accessory device which illustrates a state in which the fixing unit is coupled to the charging unit according to various embodiments of the present disclosure.

FIG. 7B is a perspective view of the accessory device 700 which illustrates a state in which the fixing unit 710 is coupled to the charging unit 720 according to various embodiments of the present disclosure.

Referring to FIGS. 7A and 7B, the accessory device 700 may include a charging unit 720 and a fixing unit 710 on which the charging unit 720 is removably mounted. According to one embodiment, the fixing unit 710 may be formed in a closed loop shape to have an opening 714 corresponding to an electronic device mounting space 721 of the charging unit 720. Without being limited thereto, however, the fixing unit 710 may be formed in an opened loop shape that can fix an electronic device.

According to embodiments, a recess 722 may be formed along the rim of the device mounting space 721 of the charging unit 720. A mounting rib 712 may be formed to protrude at a position corresponding to the recess 722 along the rim on the lower side of the fixing unit 710. According to one embodiment, the mounting rib 712 may be press-fitted to the recess 722, or may be coupled to the recess 722 in a hook manner such that the fixing unit 710 can be fixed to the charging unit 720. The fixing unit 710 may include a side face 711, and the charging unit 720 may include an accommodation recess 723, as illustrated in FIG. 7A.

According to various embodiments, the user may use various sizes of electronic devices by using one accessory device. According to one embodiment, in the case where an electronic device, which is larger than or smaller than a standard, is applied to the accessory device, the fixing unit may be removed, and the charging unit may be used as a wireless charging pad. In addition, it is possible to use a separate fixing unit that is capable of fixing a large electronic device (that may have a mounting rib with a size corresponding to the recess of the charging unit) by purchasing and coupling such a fixing unit to the charging unit.

Figure 8:
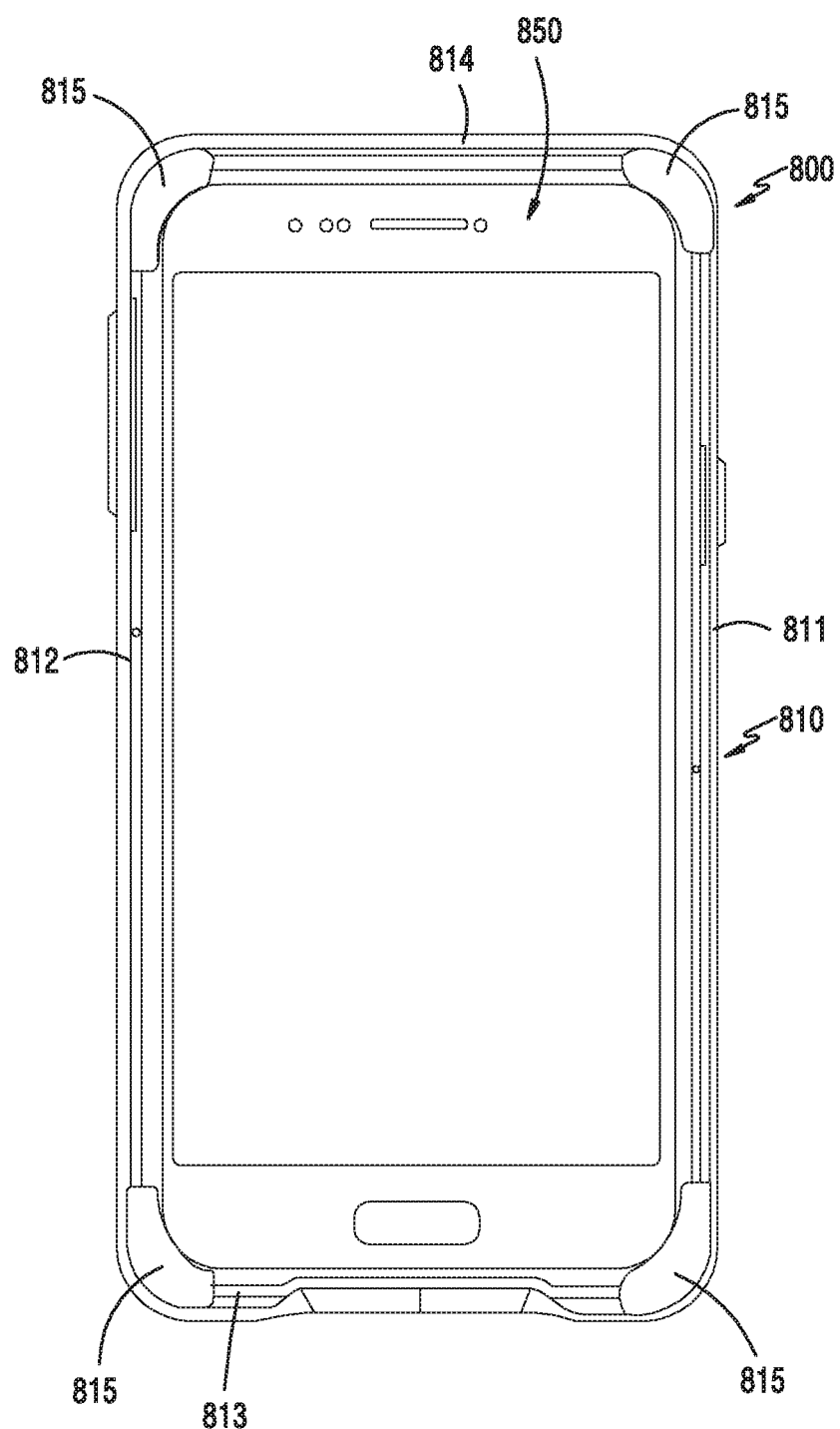
FIG. 8 is a plan view illustrating a state in which an electronic device is mounted on the accessory device according to various embodiments of the present disclosure.

FIG. 8 is a plan view illustrating a state in which an electronic device 850 is mounted on an accessory device 800 according to various embodiments of the present disclosure.

Referring to FIG. 8, the fixing unit 810 of the accessory device 800 may include right, left, upper, and lower fixing portions 811, 812, 813, and 814. According to one embodiment, when the size of the electronic device 850 to be applied to the fixing unit 810 formed by the right, left, upper, and lower fixing portions 811, 812, 813, and 814 is smaller than an application standard, a correction member 815 may be further applied to each corner of the electronic device 850. According to one embodiment, the correction member 815 may be formed of a soft material to be removably fixed to each of the right, left, upper, and lower fixing portions 811, 812, 813, and 814, or may be integrally formed with each of the right, left, upper, and lower fixing portions 811, 812, 813, and 814. By such a correction member 815, it is possible to properly align the position of an internal charging coil of the electronic device 850 with the position of a power transmission coil of the accessory device 800.

Figure 9:
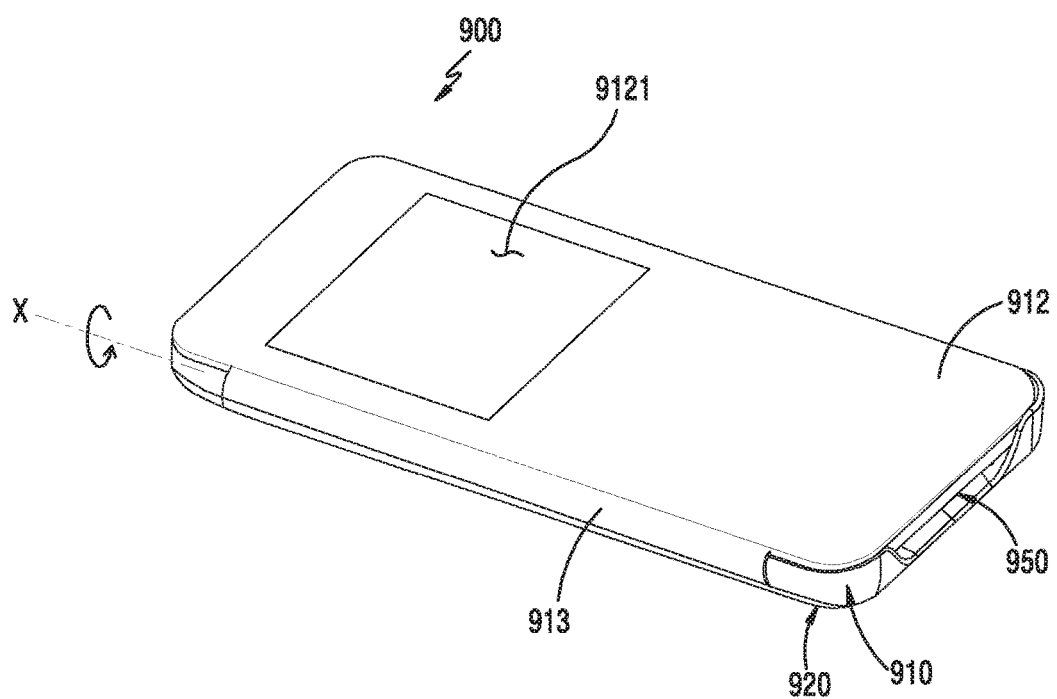
FIG. 9 is a perspective view illustrating a state in which an electronic device is mounted on the accessory device according to various embodiments of the present disclosure.

FIG. 9 is a perspective view illustrating a state in which an electronic device 950 is mounted on an accessory device 900 according to various embodiments of the present disclosure.

Referring to FIG. 9, an accessory device 900 may include a charging unit 920, a fixing unit 910 disposed above the charging unit 920 to fix an electronic device 950, and a cover member 912 integrally formed with the fixing unit 910 to open/close the electronic device 950 in a manner of closing the electronic device 950. According to one embodiment, the cover member 912 may be installed to be opened/closed by being rotated about an axis X as a rotary axis by using a connection member 913 provided on the fixing unit 910. According to one embodiment, the cover member 912 may be arranged to cover at least a partial region of a display disposed on the top face of the electronic device 950. According to one embodiment, the cover member 912 may include a transparent window 9121, thereby being configured such that, even in the state where the cover member 912 is closed, a portion of the display of the electronic device 950 can be visually confirmed through the transparent window 9121.

Figure 10:
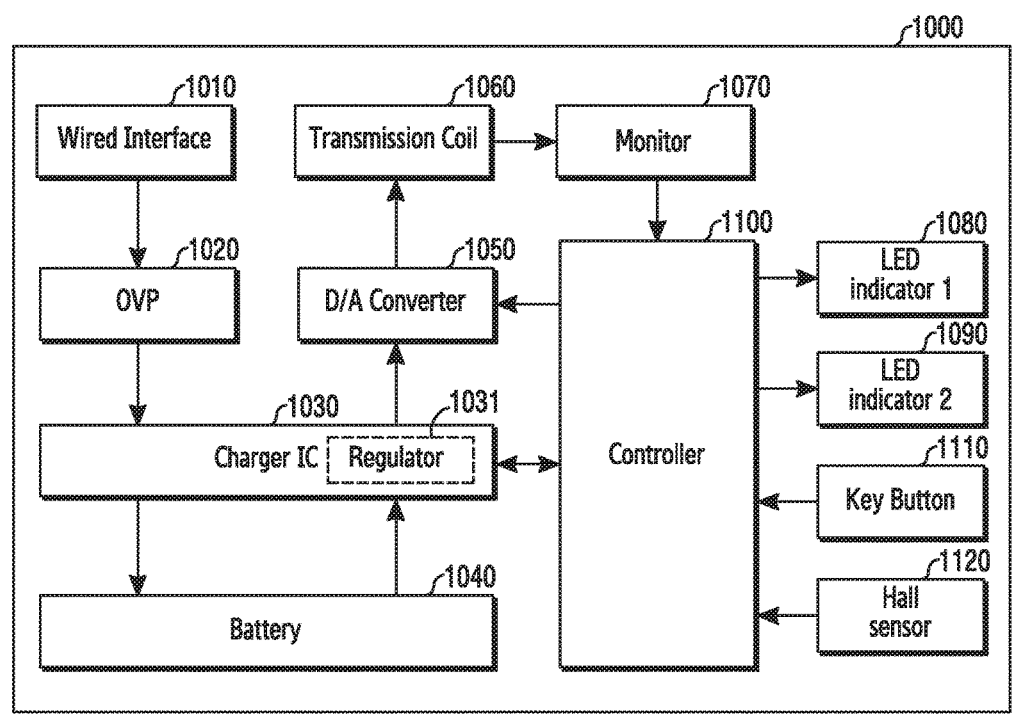
FIG. 10 is a block diagram illustrating a configuration of an accessory device according to various embodiments of the present disclosure.

FIG. 10 is a block diagram illustrating a configuration of an accessory device 1000 according to various embodiments of the present disclosure.

Referring to FIG. 10, the accessory device 1000 of FIG. 10 may be similar to or different from the accessory device 100 of FIG. 1A, the accessory device 200 of FIG. 2, the accessory device 300 of FIG. 3A, the accessory device 400 of FIG. 4A, the accessory device 600 of FIG. 6, the accessory device 700 of FIGS. 7A and 7B, the accessory device 800 of FIG. 8, or the accessory device 900 of FIG. 9.

Referring to FIG. 10, the accessory device 1000 may include a wired interface 1010, an over voltage protection (OVP) circuit 1020, a charger integrated circuit (IC) 1030, a regulator 1031, a digital to analog (D/A) converter 1050, a battery 1040, a transmission coil 1060, a monitor 1070, a controller 1100, one or more LED indicators 1080 and 1090, a key button 1110, and a hall sensor 1120.

According to various embodiments, the wired interface 1010 refers to an interface that receives power supplied from an external power source, may be supplied with power through, for example, a universal serial bus (USB) interface or a travel adapter (TA).

According to various embodiments, The OVP circuit 1020 may include a circuit that includes a function of cutting off an external power source and an internal circuit when power supplied from the outside exceeds a predetermined voltage in order to protect the internal circuit.

According to various embodiments, the charger IC 1030 may configure a circuit for charging the internal battery 1040 by using the power supplied through the wired interface 1010 and the OVP circuit 1020.

According to various embodiments, the power supplied through the wired interface 1010 and the OVP circuit 1020 may be supplied as a charging power through the charger IC 1030 so that the battery 1040 may be supplied with the charging power to be charged with electric charges. Through the charged electric charges, the battery 1040 may be used as a power source of a circuit that wirelessly transmits power.

According to various embodiments, the one or more LED indicators 1080 and 1090 may include a first LED indicator 1080 and a second LED indicator 1090. According to one embodiment, the first LED indicator 1080 may output the remaining amount of the battery 1040. According to one embodiment, the second LED indicator 1090 may indicate the current wireless charging state to the user. For example, the second LED indicator 1090 may inform the user of the current wireless charging state by always turning ON a red LED during the charging, always turning ON a green when the charging is completed, and making the red LED flicker when an abnormality occurs during the charging.

According to various embodiments, the key button 1110 may include a physical key configured to receive a user's input (request). The key button 1110 may allow the user to provide an input for confirming the remaining amount of the battery to the accessory device 1000, and when the input for confirming the remaining amount of the battery 1040 is requested, the remaining amount of the battery 1040 may be indicated through the first LED indicator 1080. According to one embodiment, the user may use the physical key button 1110 in order to provide a signal to turn ON or turn OFF the entire power of the accessory device 1000 to the accessory device 1000. A separate key button that is different from the key button for confirming the remaining amount of the battery 1040 may be used in order to turn ON or turn OFF the power, or the key button for confirming the remaining amount of the battery 1040 may be commonly used in order to turn ON or turn OFF the power while changing the time of pushing the input key button.

According to various embodiments, in the case where the battery 1040 is used as a power source, and in performing a wireless power transmission proceeds, when the supply voltage of the battery 1040 is inconsistent with the voltage requested in the wireless power transmission, the battery 1040 may be used for making the supply voltage consistent with the requested voltage. According to one embodiment, when the voltage of the battery 1040 does not exceed 4.4V at the highest and the voltage requested for a wireless power transmission is 5V, the regulator 1031 may include a circuit configured to function to increase the output voltage to be higher than the input voltage like a booster. According to one embodiment, when the voltage of the battery 1040 is 5V or more at the lowest and the voltage requested for a wireless power transmission is 5V, the regulator 1031 may include a circuit configured to function to decrease the output voltage to be lower than the input voltage like a AC/DC converter, a low-dropout (LDO), or the like. According to one embodiment, the regulator 1031 may be included within the charger IC 1030 or may be implemented using a separate circuit.

According to various embodiments, the D/A converter 1050 may include a circuit configured to convert a power, which has been rectified into a voltage suitable for a wireless power transmission through the regulator 1031, into an alternating current. According to one embodiment, the D/A converter 1050 may be implemented as a circuit, such as an inverter.

According to various embodiments, the transmission coil 1060 may have a loop antenna structure. According to one embodiment, the alternating current, which has been converted from the power through the D/A converter 1050, flows through the transmission coil 1060. According to a change of flow of the current (included in the influence of a magnetic field), a magnetic field may be generated around the transmission coil 1060, and an electromotive current (electromotive force) according to an electromagnetic induction phenomenon may be generated in a neighboring coil (a power reception coil of the electronic device) (not illustrated) so that power can be supplied to an external electronic device (not illustrated) connected to the neighboring coil. According to one embodiment, the transmission coil may include a matching circuit of L and C in order to tune a frequency to be suitable for a wireless power transmission.

According to various embodiments, the monitor 1070 may be configured to monitor the power (voltage and/or current) generated in the transmission coil 1060. According to one embodiment, the monitor 1070 may monitor a change of a voltage or a current by a carrier wave signal that is generated in the power reception coil of an external electronic device (notifying a charging state through in-band communication).

According to various embodiments, the controller 1100 may determine a monitored value for the power (voltage and/or current) applied to the transmission coil 1060 through the monitor 1070 so as to control the supply power (voltage or current). According to one embodiment, the controller 1100 may determine a change of a voltage or a current applied to the transmission coil by a carrier wave signal that is generated in the power reception coil of an external electronic device through the monitor 1070, and may control the wireless power transmission according to a signal (command) requested by the external electronic device. For example, the controller 1100 may increase the power to be applied to the transmission coil 1060 by controlling the D/A converter 1050 in response to a supplied power increase request signal received from the external electronic device. According to one embodiment, the controller 1100 may control the D/A converter 1050 to decrease the power applied to the transmission coil 1060 or interrupt the power source in response to a request signal that is received from the external electronic device in relation to decrease a supplied power or to stop the power source perform a power such that the power to be applied to the transmission coil 1060. According to one embodiment, the controller 1100 may indicate the current charging state through the first and second indicators 1080 and 1090 to be confirmed by the user.

According to various embodiments, the hall sensor 1120 may detect the magnetic force of one or more magnets that have already been disposed or intentionally disposed within an external electronic device so as to provide a detection signal to the controller 1100 of the accessory device 1000. According to one embodiment, the accessory device 1000 may initiate the wireless charging operation merely based on an operation of mounting the external electronic device on the accessory device by the detection of the magnetic force by the hall sensor 1120.

Figure 11:
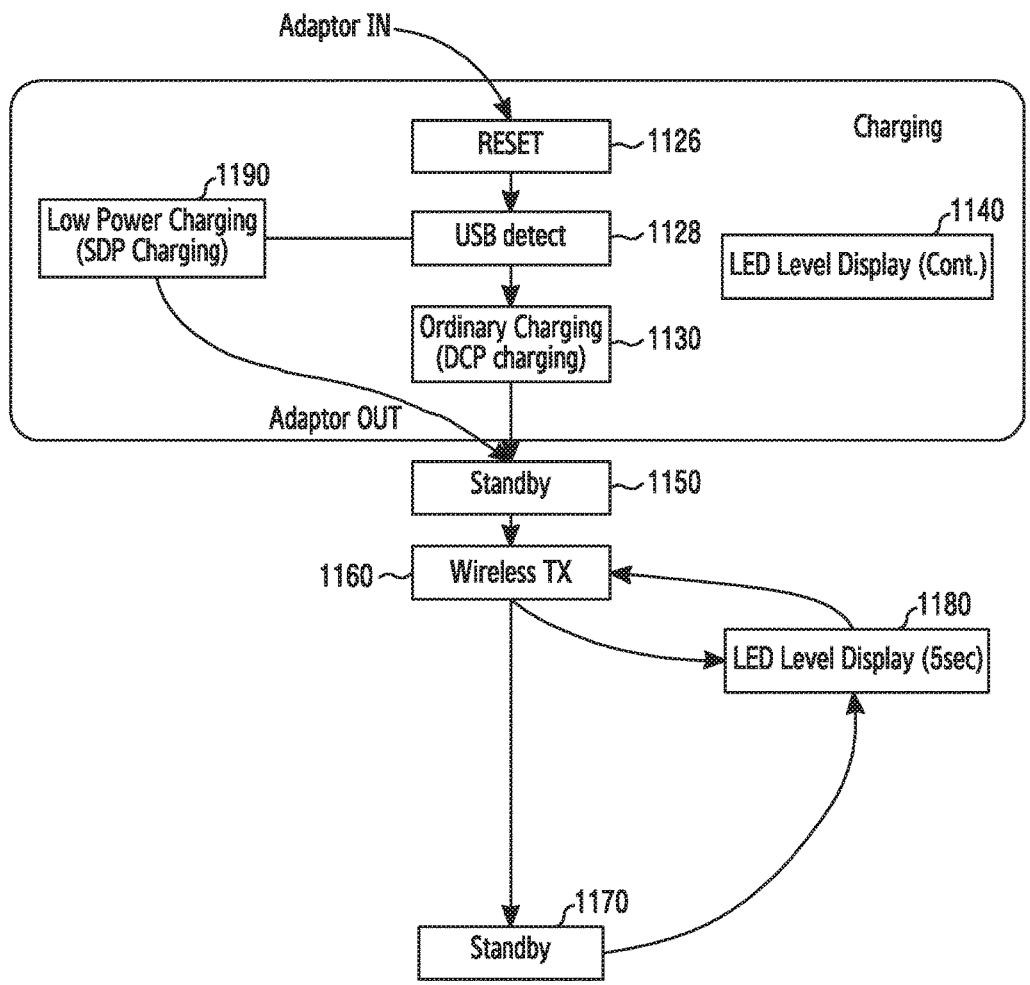
FIG. 11 is a view illustrating a charging flow of an accessory device according to various embodiments of the present disclosure.

FIG. 11 is a view illustrating a charging flow of an accessory device according to various embodiments of the present disclosure.

Referring to FIGS. 10 and 11, the accessory device 1000 may not perform the wireless power transmission operation when power is supplied from the outside through the wired interface 1010. According to one embodiment, when no power is supplied from the outside through the wired interface, the accessory device 1000 may be switched to the wireless charging standby state.

In operation 1126, when a charging connector for applying an external power is connected through the wired interface, the operation of the accessory device 1000 may be reset.

In operation 1128, the power supplied through the wired interface 1010 may be monitored. According to one embodiment, when the power monitored from the wired interface 1010 is, for example, a USB power (e.g., a PC power) that is 500 mA or less at the highest, USB charging may be performed in operation 1190 to charge the battery (via low power charging or standard downstream port (SDP) charging). According to one embodiment, when the power monitored from the wired interface 1010 is, for example, an adaptor power (e.g., a travel adaptor (TA) power) that is used an ordinary alternating current power as power 500 mA or less at the highest, charging suitable for a corresponding supplied current may be performed so as to charge the battery via dedicated charging port (DCP) charging, as in operation 1130. According to one embodiment, the charging operation may be continuously performed until the internal battery 1040 of the accessory device 1000 is fully charged, or the wired interface connector is separated, including an LED that displays the level of charging, as in operation 1140. In the case where the battery 1040 is fully charged or the wired interface connector is separated, the standby state for wireless charging may be maintained in operation 1150.

In operation 1160, when the wireless charging condition is satisfied, wireless charging to the external electronic device through the accessory device 1000 may be performed. According to one embodiment, when it is detected by the hall sensor 1120 that an external electronic device is mounted on the accessory device 1000, the controller 1100 may perform the wireless power transmission. According to one embodiment, the wireless power transmission may be continuously performed until the external electronic device is moved away from a neighboring position, until the battery of the external electronic device is fully charged, and/or until the power of the accessory device 1000 is turned OFF by the user through the key button.

According to one embodiment, in operation 1170, when the external electronic device is moved away from the charging position of the accessory device 1000, when the battery of the external electronic device is fully charged, or when the user turned off the power of the accessory device 1000, the accessory device 1000 may be switched to a standby mode.

According to various embodiments, until the power of the accessory device 1000 is turned ON again by the user's request or until an external electronic device is sensed again at the neighboring position after a predetermined length of time (e.g., 7 sec) elapses after the external electronic device was moved away from the charging position of the accessory device 1000, the standby mode may be maintained. According to one embodiment, the accessory device 1000 may be switched to the wireless charging mode when the power is turned ON again by the user's request or the external electronic device is sensed at the neighboring position. When the standby mode is switched to a wireless Tx mode, the first LED indicator 1080 may be activated for a predetermined length of time (e.g., 5 sec) so as to perform operation 1180 to indicate the current remaining amount of charge in the battery 1040.

According to various embodiments, there may be provided an accessory device detachably mounted on a mobile electronic device that includes a housing including a first face facing in a first direction, a second face facing a second direction that is opposite to the first direction, and a side face that at least partially encloses a space between the first face and the second face. The accessory device may include: a housing including a first face configured to face the second face of the electronic device when the housing is mounted on the electronic device, a second face directed opposite to the first face, and a third face extending in the first direction from the first face so as to enclose at least a portion of the side face; a battery disposed between the first face and the second face of the housing of the accessory device; and at least one conductive pattern electrically connected to the battery, and configured to transmit power to the electronic device in a wireless manner or to receive power from an external device in a wireless manner. A substantially entire area of the first face and a substantially entire area of the third face of the housing of the accessory device are formed of a non-conductive material.

According to various embodiments, no exposed conductive material may exist on the substantially entire area of the first face and the substantially entire area of the third face of the housing of the accessory device.

According to various embodiments, the conductive pattern may be positioned between the battery and the first face of the housing of the accessory device.

According to various embodiments, the electronic device may include a circuit electrically connected to the battery and the at least one conductive pattern, and the circuit may be configured to apply a current output from the battery to the at least one conductive pattern, and to transmit power to the electronic device based on the current applied to the at least one conductive pattern.

According to various embodiments, the circuit may generate information based on a charged degree of the battery, and may transmit the information outwardly through the conductive pattern.

According to various embodiments, the circuit may be configured to transmit power to the electronic device with a first frequency, and may transmit the generated information outwardly by changing the first frequency to a second frequency.

According to various embodiments, the first frequency and the second frequency are included in substantially equal frequency bands, and the circuit may be configured to transmit the power and the information to the electronic device simultaneously by using the frequency bands.

According to various embodiments, the third face of the housing of the accessory device may include one or more protrusions formed in the second direction.

According to various embodiments, the one or more protrusions may include a first protrusion protruding by a first height from the third face, and a second protrusion protruding from the third face by a second height that is higher than the first height.

According to various embodiments, the first protrusion may protrude from a portion of the third face of the housing of the accessory device in a third direction that is directed to a portion of the side face of the housing of the electronic device, and the second protrusion may protrude from another portion of the third face in a fourth direction that is orthogonal to the third direction.

According to various embodiments, the accessory device may further include a hall integrated circuit disposed between the first face and the second face of the housing of the accessory device.

According to various embodiments, there may be provided an electronic device that includes: a housing including a first face facing in a first direction, a second face facing in a second direction that is opposite to the first direction, and a side face that at least partially encloses a space between the first face and the second face; a cover accessory detachably mounted on the housing, and including a first face configured to face the second face of the electronic device when the cover accessory is mounted on the electronic device, a second face directed opposite to the first face, and a third face extending in the first direction from the first face so as to enclose at least a portion of the side face; a first battery disposed within the cover accessory; a first conductive pattern electrically connected to the first battery, and configured to transmit power outside the cover accessory in a wireless manner; a second battery disposed within the cover accessory; and a second conductive pattern electrically connected to the second battery, and configured to receive power from the outside of the cover accessory in a wireless manner. A substantially entire area of the first face and a substantially entire area of the third face of the housing of the cover accessory are formed of a non-conductive material.

According to various embodiments, the electronic device may include a circuit electrically connected to the battery and the at least one conductive pattern.

The first circuit may be configured to apply a current output from the first battery to the first conductive pattern, and to transmit power to the second conductive pattern based on the current applied to the first conductive pattern.

According to various embodiments, the electronic device may include a second circuit electrically connected to the second battery and the second conductive pattern.

The second circuit may be configured to receive at least a part of the power transmitted from the first conductive pattern by using the second conductive pattern, and to charge the second battery based on the received power.

According to various embodiments, when the cover accessory is mounted, the first conductive pattern and the second conductive pattern may be aligned to each other when viewed from above the first face of the housing.

According to various embodiments, at least a partial region of the first face of the housing may include a display.

According to various embodiments, the cover accessory includes a fourth face that extends from the third face of the cover accessory, and the fourth face may be rotatably arranged to cover at least a partial region of the display.

According to various embodiments, the cover accessory may include a charging connector port to charge the first battery in a wired manner.

According to various embodiments, the cover accessory may include at least one LED indicator configured to visually inform a user of a charge state of the first battery and the second battery.

According to various embodiments, the cover accessory may include at least one key button to confirm a charging status of the first battery and the second battery, to initiate a wireless charging operation of the cover accessory, or to turn ON/OFF a power source of the cover accessory.

According to various embodiments, the electronic device is protected and at the same time, the wireless charging is performed even while the electronic device is carried or used so that the portability and use convenience of an electronic device can be improved.

While the present disclosure has been shown and described with reference to various embodiments thereof, it will be understood by those skilled in the art that various changes in form and details may be made therein without departing from the spirit and scope of the of the present disclosure as defined by the appended claims and their equivalents.

What is claimed is:

1. An accessory device for being detachably mounted on an electronic device, the electronic device comprising a housing, the housing of the electronic device comprising a first face facing in a first direction, a second face facing a second direction that is opposite to the first direction, and a side face that at least partially encloses a space between the first face and the second face, the accessory device comprising:
   a housing comprising:
      a first face facing the second face of the electronic device when the housing is mounted on the electronic device,
      a second face directed opposite to the first face, and
      a third face extending in the first direction from the first face so as to enclose at least a portion of the side face;
   a battery positioned between the first face and the second face of the housing of the accessory device;
   at least one conductive pattern electrically connected to the battery, and configured to transmit power from the battery to the electronic device in a wireless manner; and
   a circuit electrically connected to the battery and the at least one conductive pattern,
   wherein, a substantially entire area of the first face and a substantially entire area of the third face of the housing of the accessory device comprise a non-conductive material, and
   wherein the circuit is configured to:
      transmit power from the battery to the electronic device with a first frequency through the at least one conductive pattern, and
      transmit information on a state of the accessory device through the at least one conductive pattern, with a second frequency which is changed from the first frequency.

2. The accessory device of claim 1, wherein no exposed conductive material exists on:
   the substantially entire area of the first face and
   the substantially entire area of the third face of the housing of the accessory device.

3. The accessory device of claim 1, wherein the conductive pattern is positioned between the battery and the first face of the housing of the accessory device.

4. The accessory device of claim 3, wherein the circuit is further configured to:
   apply a current output from the battery to the at least one conductive pattern, and
   transmit power to the electronic device based on the current applied to the at least one conductive pattern.

5. The accessory device of claim 4, wherein the circuit is further configured to generate the information based on a charged degree of the battery.

6. The accessory device of claim 1,
   wherein the first frequency and the second frequency are included in substantially equal frequency bands, and
   wherein the circuit is further configured to transmit the power and the information to the electronic device simultaneously by using the frequency bands.

7. The accessory device of claim 1, wherein the third face of the housing of the accessory device comprises one or more protrusions formed in the second direction.

8. The accessory device of claim 7, wherein the one or more protrusions comprise:
   a first protrusion protruding by a first height from the third face, and
   a second protrusion protruding from the third face by a second height that is higher than the first height.

9. The accessory device of claim 8,
   wherein the first protrusion protrudes from a portion of the third face of the housing of the accessory device in a third direction that is directed to a portion of the side face of the housing of the electronic device, and
   wherein the second protrusion protrudes from another portion of the third face in a fourth direction that is orthogonal to the third direction.

10. The accessory device of claim 1, further comprising:
   a hall integrated circuit disposed between the first face and the second face of the housing of the accessory device.

11. An electronic device comprising:
a housing comprising:
a first face directed in a first direction,
a second face directed in a second direction that is opposite to the first direction, and
a side face that at least partially encloses a space between the first face and the second face;
a cover accessory detachably mountable on the housing, and comprising:
a first face facing the second face of the electronic device when the cover accessory is mounted on the electronic device,
a second face opposite to the first face, and
a third face extending in the first direction from the first face so as to enclose at least a portion of the side face;
a first battery disposed within the cover accessory;
a first conductive pattern electrically configured to:
connect to the first battery, and
transmit power from the first battery to outside the cover accessory in a wireless manner;
a first circuit electrically connected to the first battery and the first conductive pattern;
a second battery disposed within the housing;
a second conductive pattern electrically configured to:
connect to the second battery, and
receive power from outside in a wireless manner to charge the second battery,
wherein substantial areas of the first face and the third face of the housing of the cover accessory comprises a non-conductive material, and
wherein the first circuit is configured to:
transmit power to the second conductive pattern with a first frequency through the first conductive pattern, and
transmit information on a state of the accessary device through the first conductive pattern, with a second frequency which is changed from the first frequency.

12. The electronic device of claim 11, wherein the first circuit is further configured to:
apply a current output from the first battery to the first conductive pattern, and
transmit power to the second conductive pattern based on the current applied to the first conductive pattern.

13. The electronic device of claim 11, further comprising:
a second circuit electrically connected to the second battery and the second conductive pattern,
wherein the second circuit is configured to:
receive at least a part of the power transmitted from the first conductive pattern by using the second conductive pattern, and
charge the second battery based on the received power.

14. The electronic device of claim 11, wherein, when the cover accessory is mounted, the first conductive pattern and the second conductive pattern are aligned to each other when viewed from above the first face of the housing.

15. The electronic device of claim 11, wherein at least a partial region of the first face of the housing comprises a display.

16. The electronic device of claim 15,
wherein the cover accessory comprises a fourth face that extends from the third face of the cover accessory, and
wherein the fourth face is rotatably arranged to cover at least a partial region of the display.

17. The electronic device of claim 11, wherein the cover accessory comprises a charging connector port to charge the first battery in a wired manner.

18. The electronic device of claim 11, wherein the cover accessory comprises at least one LED indicator for visually displaying to a user of a charge state of the first battery and the second battery.

19. A method of wirelessly charging an electronic device via an accessory device, the method comprising:
detachably mounting the accessory device on the electronic device;
identifying whether at least one conductive pattern is electrically connected to a battery;
applying a current output from the battery to at least one conductive pattern in response to the identification;
transmitting power from the battery to the electronic device with a first frequency through the at least one conductive pattern; and
transmitting information on a state of the accessary device through the at least one conductive pattern with a second frequency which is distinct from the first frequency.

20. The method of claim 19, wherein a plurality of areas of the housing of the accessory device comprise a non-conductive material.

21. The accessory device of claim 1, wherein the electronic device comprises at least one key button for at least one of:
identifying a charging status of the batter,
initiating a wireless charging operation, or
turning on or off a power source.

* * * * *